United States Patent
Melo et al.

(10) Patent No.: US 9,625,071 B2
(45) Date of Patent: Apr. 18, 2017

(54) GARDEN HOSE COUPLING WITH PROTECTIVE, STRAIN REDUCING SLEEVE

(71) Applicant: TEKNOR APEX COMPANY, Pawtucket, RI (US)

(72) Inventors: Michael Melo, North Dartmouth, MA (US); Timothy L. Chapman, Stanton, TN (US)

(73) Assignee: TEKNOR APEX COMPANY, Pawtucket, RI (US)

( * ) Notice: Subject to any disclaimer, the term of this patent is extended or adjusted under 35 U.S.C. 154(b) by 20 days.

(21) Appl. No.: 14/694,244

(22) Filed: Apr. 23, 2015

(65) Prior Publication Data

US 2016/0312940 A1    Oct. 27, 2016

(51) Int. Cl.
   *F16L 33/207*        (2006.01)
   *F16L 57/00*         (2006.01)

(52) U.S. Cl.
   CPC ......... *F16L 33/2071* (2013.01); *F16L 57/005* (2013.01)

(58) Field of Classification Search
   CPC .................................. F16L 57/02; F16L 35/00
   USPC .................................................. 285/115, 114
   See application file for complete search history.

(56) References Cited

U.S. PATENT DOCUMENTS

| | | | | |
|---|---|---|---|---|
| 1,904,615 A | * | 4/1933 | Bristol | G01D 11/24 285/114 |
| 2,236,731 A | * | 4/1941 | Oberly | B67D 7/40 285/115 |
| 2,516,583 A | * | 7/1950 | Moore | F16L 35/00 285/114 |
| 3,001,725 A | | 5/1958 | Lockett | |
| 3,333,871 A | * | 8/1967 | Abbiati | F16L 35/00 285/114 |
| 4,489,961 A | | 12/1984 | Laidig | |
| 5,143,409 A | | 9/1992 | Lalikos | |
| 5,181,750 A | | 1/1993 | Reum | |
| 5,246,254 A | * | 9/1993 | LoJacono, Jr. | F16L 35/00 285/114 |
| 5,286,068 A | | 2/1994 | Wiebe | |
| 5,333,650 A | | 8/1994 | Folkman | |
| D356,858 S | | 3/1995 | Folkman | |

(Continued)

FOREIGN PATENT DOCUMENTS

| FR | EP 0777034 A1 | * | 6/1997 | ........... E21B 17/017 |
|---|---|---|---|---|
| FR | 2760813 A1 | * | 9/1998 | ........... E21B 17/017 |

(Continued)

*Primary Examiner* — David E Bochna
(74) *Attorney, Agent, or Firm* — Hudak, Shunk & Farine Co. LPA

(57) ABSTRACT

A flexible hose assembly, in particular a garden hose, having an end fitting including a protective, strain reducing sleeve fixedly secured at the male end segment of a fluid conveying tube. The sleeve is flexible and provides strain relief to the portion of the tube surrounded by the sleeve and reduces the ability of the tube to kink in the area adjacent to the end fitting. The prevention of kinks at the male end of the tube reduces stresses in this area of the tube and greatly extends the working life of the sleeve and tube assembly. The sleeve additionally serves as a gripping surface for one or more of facilitating the attachment of the hose assembly to another device such as a flow control device and holding the end of the hose during use.

16 Claims, 2 Drawing Sheets

(56) References Cited

U.S. PATENT DOCUMENTS

| | | | |
|---|---|---|---|
| 5,526,846 A * | 6/1996 | Maloberti | F16L 35/00 138/109 |
| 5,816,622 A | 10/1998 | Carter | |
| 6,068,622 A | 5/2000 | Sater et al. | |
| D501,539 S | 2/2005 | Dyer, III | |
| 7,357,424 B2 | 4/2008 | Powell et al. | |
| D624,161 S | 9/2010 | Zore | |
| 8,096,588 B2 | 1/2012 | Winzeler | |
| 8,291,941 B1 | 10/2012 | Berardi | |
| 8,291,942 B2 | 10/2012 | Berardi | |
| D671,196 S | 11/2012 | Montalvo et al. | |
| 2008/0289231 A1 * | 11/2008 | Green | F16L 35/00 40/316 |
| 2013/0113205 A1 | 5/2013 | Berardi | |
| 2014/0361531 A1 * | 12/2014 | Siders | F16L 35/00 285/114 |
| 2015/0115597 A1 * | 4/2015 | Lorraine | F16L 35/00 285/115 |

FOREIGN PATENT DOCUMENTS

| | | | | |
|---|---|---|---|---|
| GB | 634405 A * | 3/1950 | | F16L 35/00 |
| GB | 732529 A * | 6/1955 | | F16L 35/00 |
| GB | 1496896 A * | 1/1978 | | F16L 33/245 |
| GB | 2040014 A * | 8/1980 | | E21B 17/017 |

\* cited by examiner

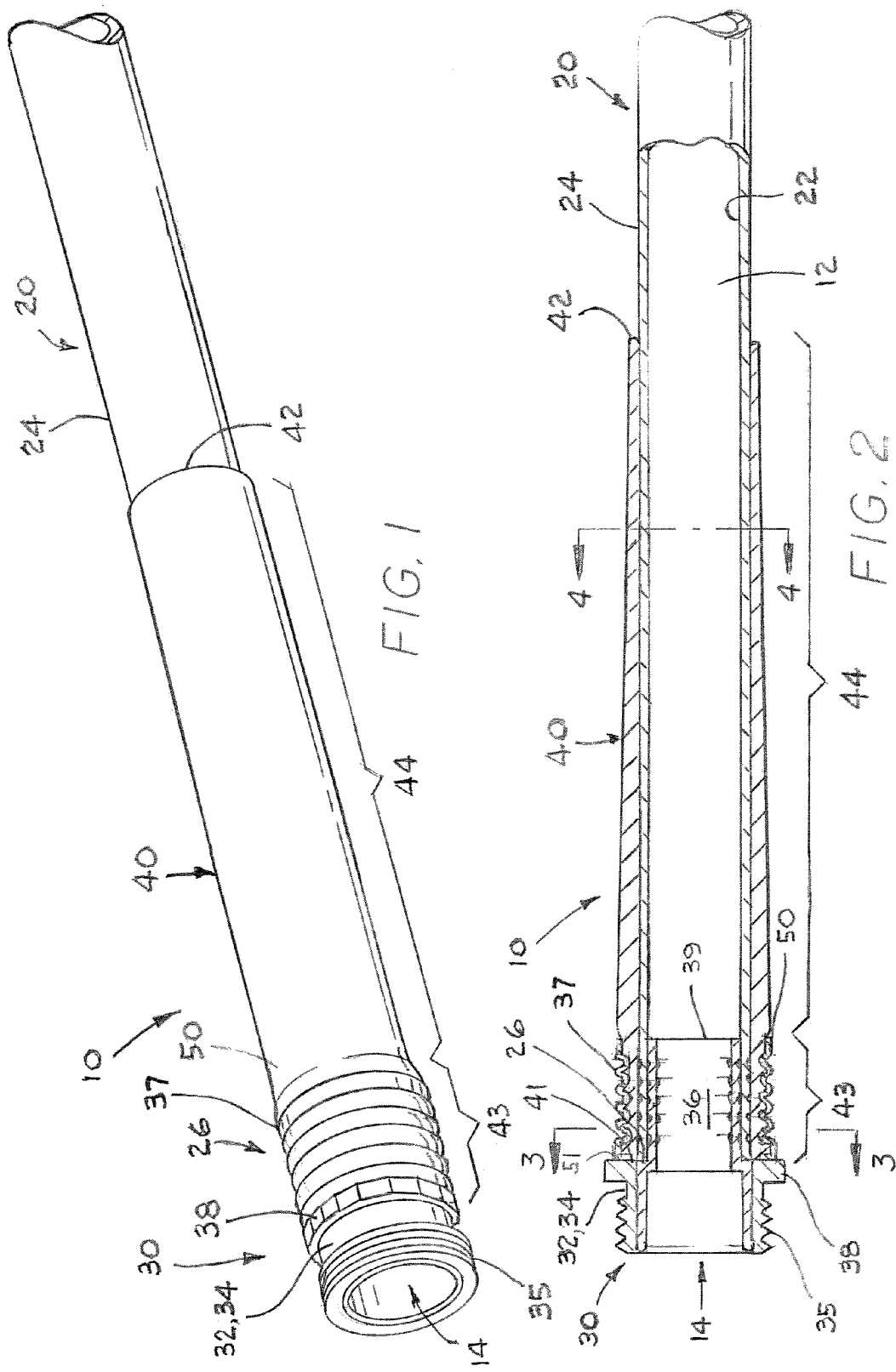

GARDEN HOSE COUPLING WITH PROTECTIVE, STRAIN REDUCING SLEEVE

FIELD OF THE INVENTION

The present invention relates to a flexible hose assembly, in particular a garden hose, having an end fitting including a protective, strain reducing sleeve fixedly secured at the male end segment of a fluid conveying tube. The sleeve is flexible and provides strain relief to the portion of the tube surrounded by the sleeve and reduces the ability of the tube to kink in the area adjacent to the end fitting. The prevention of kinks at the male end of the tube reduces stresses in this area of the tube and greatly extends the working life of the sleeve and tube assembly. The sleeve additionally serves as a gripping surface for one or more of facilitating the attachment of the hose assembly to another device such as a flow control device and holding the end of the hose during use.

BACKGROUND OF THE INVENTION

Hoses are commonly attached to end fittings or couplings which serve as a connection point, for example, to a fluid supply in a case where the end fitting is an inlet or to a flow control device such as a nozzle where the end fitting is an outlet. Many different types of end fittings are known in the art, with the fittings being fixed to the hose or tube through a connection to one or more of the outer surface of the hose and inner surface of the hose. Regardless of the connection type, problems exist as the section of the hose adjacent to its connection to the end fitting can kink or collapse if the hose is moved transversely to the axial length of the coupling or hose thereby restricting flow through the hose and/or leading to premature mechanical failure. Additional problems include premature mechanical failure from loss of adhesion between the inner and outer layers of the hose, color change or stress whitening in the jacket area, and holes or tears in the outer jacket due to repeated bending during use of the hose.

Various devices have been proposed in order to alleviate the problems noted above and others, see U.S. Pat. Nos. 4,489,961; 5,143,409; 5,181,750; 5,286,068; 5,333,650; 5,816,622; 6,068,622; 7,357,424 and D356858; and U.S. Publication No. 2013/0113205.

In view of the above, the need still exists for an improved flexible hose assembly including a protective sleeve that allows the hose to have a degree of flex at a connection area to the end fitting while relieving strain in the immediate area.

SUMMARY OF THE INVENTION

Accordingly, it is an object of the present invention to provide a flexible hose assembly, in particular a garden hose, having an end fitting comprising a protective sleeve permanently fixed to the end fitting and providing strain relief to the tube or hose of the assembly adjacent the end fitting.

It is a further object of the present invention to provide a permanent sleeve affixed to a male end fitting that serves as a gripping surface in addition to functioning as a strain reducing feature.

An additional object of the present invention is to provide a hose assembly including an end fitting comprising a male stem inserted into a tube end, with the tube being secured, along with the protective sleeve, between the stem and a ferrule of the end fitting.

Still another object of the present invention is to provide an end fitting that permanently captures and secures the protective sleeve, wherein the sleeve has a substantially constant wall thickness along the connection segment of the sleeve longitudinally coextensive with the length of the ferrule or has a wall thickness that varies less than 10% along the length of the sleeve between longitudinal ends of the ferrule; and wherein the sleeve has a tapered section and/or a section of decreased wall thickness in a strain reducing segment that intends longitudinally from the second end of the ferrule to a second end of the sleeve opposite the end fitting.

Another object of the present invention is to provide a hose assembly including a protective sleeve having a wall thickness in a strain reducing segment that extends longitudinally from the second end of the ferrule to a second end of the sleeve opposite the end fitting that has a decreased wall thickness as compared to a minimum wall thickness of connection segment of the sleeve longitudinally coextensive with the length of the ferrule, with the minimum strain reducing segment wall thickness being greater than 50 or 55% of the minimum thickness of the sleeve in the connection segment.

Still an additional object of the present invention is to provide a protective polymeric sleeve having a tapered wall section extending adjacent the ferrule to a distal end of the sleeve opposite the end fitting, with the distal end having a wall thickness that is at least 50 or 55% of the wall thickness of the sleeve directly adjacent the ferrule.

A further object of the present invention is to provide a protective, polymeric sleeve having a distal, lower end that is rounded, and without sharp edges, in order to prevent the sleeve from damaging the outer surface of the hose or injuring the user.

In one aspect, an embodiment of the hose assembly is described, comprising a tube comprising a polymeric material, the tube having a first end and a second end, an end fitting comprising a coupler comprising a threaded section, a flexible polymeric sleeve having a first end and a second end, wherein the sleeve extends over a portion of the tube with the first end of the sleeve located adjacent the first end of the tube, wherein the first end of the sleeve and the first end of the hose are fixedly secured to the end fitting, wherein the sleeve has a first wall thickness in a connection segment extending a distance from the first end of the sleeve and a lesser, variable wall thickness along a length of the sleeve inwardly from the connection segment in a strain reducing segment that tapers down in wall thickness in a direction towards the second end.

In another aspect, an embodiment of the hose assembly is described, comprising a tube comprising polymeric material, the tube having a first end and a second end, an end fitting comprising a coupler comprising a threaded section and a stem; and a ferrule, a flexible polymeric sleeve having a first end and a second end, wherein the first end of the tube is disposed over the stem, wherein the sleeve extends over the tube with the first end of the sleeve located adjacent the first end of the tube, wherein the first end of sleeve and the first end of the hose are fixedly secured between the ferrule and the stem, wherein the sleeve has a substantially constant wall thickness in a connection segment longitudinally coextensive with the ferrule, wherein the sleeve has a wall thickness in a strain reducing segment adjacent the ferrule that tapers down in wall thickness in a direction towards the second end of the sleeve.

BRIEF DESCRIPTION OF THE DRAWINGS

The invention will be better understood and other features and advantages will become apparent by reading the detailed description of the invention, taken together with the drawings, wherein:

FIG. 1 is a perspective view of one embodiment of a hose assembly of the present invention including a fitting having a protective, polymeric sleeve fixedly secured at the end segment of the hose;

FIG. 2 is cross-sectional side view of one embodiment of the hose assembly;

DETAILED DESCRIPTION OF THE INVENTION

Figure 4:
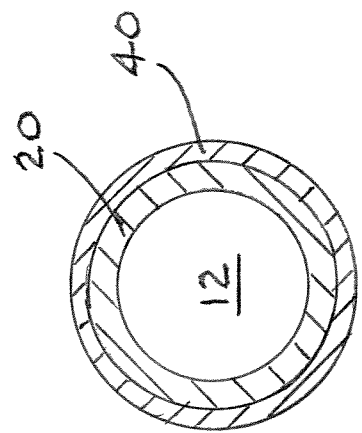
FIG. 4 is a cross-sectional view of the hose assembly shown through line 4-4 of FIG. 2.

In this specification, all numbers disclosed herein designate a set value, individually, in one embodiment, regardless of whether the word "about" or "approximate" or the like is used in connection therewith. In addition, when the term such as "about" or "approximate" is used in conjunction with a value, the numerical range may also vary, for example by 1%, 2%, 5%, or more in various other, independent, embodiments.

The hose assembly of the present invention includes a fluid conveying tube and an end fitting attached to each end of the tube that allows connection to a fluid source, such as a water supply; or a fluid control device, such as a nozzle or the like. A sleeve is fixedly secured to at least one end of the hose assembly, preferably a male end in one embodiment, in order to provide strain relief to the portion of the tube that the sleeve surrounds and reduces the ability of the tube to kink in the area adjacent to the end fitting. When utilized herein, the term "wall thickness" refers to a thickness of a construction, such as the sleeve, tube or hose, measured in a radial direction, unless otherwise specified.

Referring now to the drawings, wherein like reference numbers refer to like parts throughout the several views, a hose assembly 10 is partially illustrated in FIG. 1, in a perspective view. Hose assembly 10 includes a fluid passage 12, see FIG. 2, located between an inlet and an outlet, see outlet 14, for example in FIG. 1. Hose assembly 10 includes a tube 20 that extends between end fittings 30 with the end fittings 30 preferably including a male coupler 34 and a female coupler. Tube 20 has an inner surface 22 and an outer surface 24, see FIGS. 1 and 2, for example.

FIGS. 1 and 2 illustrate male coupler 34 secured to first end 26 of hose or tube 20 with male coupler 34 designed to mateably engage a female coupler of another device, such as a nozzle or other fluid flow regulating device, in a threaded detachable fashion. Male coupler 34 includes multiple components, including threaded section 35, stem 36, ferrule 37 and nut 38. The stem 36 is located on male coupler 34 below or inward from nut 38 or the bottom of threaded section 35 in a case where nut 38 is not present.

The male coupler preferably has a machined outer body and a stamped inner stem. The machined outer body contains threads that mate with various nozzles, sprinklers, or other attachments. The machined outer body can be machined from brass, aluminum, stainless steel, or other corrosion resistant materials. The machined outer body can use different designs for aesthetic or functional benefit. The stamped inner stem is pressed into the machined outer body. In one embodiment, the stamped inner stem contains a rolled edge that is part of the sealing surface between the assembled coupler and the washer in the attachment (nozzle, sprinkler, etc.). This rolled edge is pressed against the threaded end of the machined outer body. The stamped inner stem is typically made out of brass but can be formed from different materials if desired. The inner stem material must be soft enough to radially expand without cracking. The opposite end 39 of the stamped inner stem is designed to slide into the internal diameter of tube 12. Stem 36 is then radially expanded to permanently secure the male coupler 34, ferrule 37, and flexible sleeve 40 to the end of tube 12.

As illustrated in FIGS. 1 and 2, sleeve 40 has a first end 41 a second end 42, with the first end 41 preferably being aligned with first end 26 of tube 20, perpendicular to the longitudinal axis of the tube. Sleeve 40 has an inner diameter that is preferably cylindrical and equal to or greater than the outer diameter of tube 20 in order to allow the sleeve 40 to be positioned over the first end portion of tube 20 as illustrated. The inner diameter of the sleeve is in contact with the outer diameter of the tube along the longitudinal length of the sleeve in one embodiment. In one embodiment the sleeve has a connection segment 43 and a strain reducing segment 44, see FIGS. 1 and 2. Connection segment 43 is the section of the sleeve that is coextensive with the length of ferrule 37, between first end 51 and second end 50 and thus is located beneath ferrule 37 as measured in an axial or lengthwise direction of hose assembly 10. Strain reducing segment 44 extends from the second, inward end 50 of ferrule 37 to the second end 42 of sleeve and is the visible portion of sleeve 40 illustrated in FIG. 1.

Figure 3:
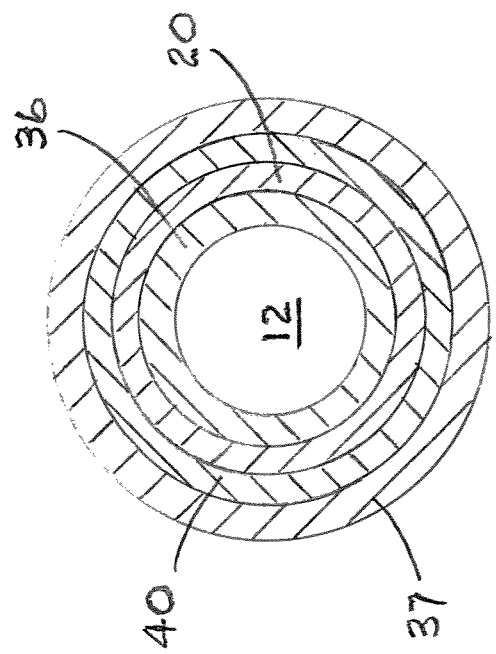
FIG. 3 is a cross-sectional view of the hose assembly shown through line 3-3 of FIG. 2.

Sleeve 40 has a wall thickness in the connection segment along the longitudinal axis of the hose assembly, coextensive with the ferrule that is greater than a wall thickness in at least one area of the strain reducing segment, see FIGS. 3 and 4 for example. Stated in another manner, the sleeve 40 has a minimum wall thickness in the connection segment that is greater than a wall thickness in an area laterally adjacent the ferrule in the strain reducing segment 44 of the sleeve 40. In one embodiment the sleeve has a substantially constant wall thickness in the connection segment axially coextensive with the ferrule. The term "substantially" with respect to wall thickness means that the wall thickness varies less than 5%, desirably less than 3% and preferably less than 1%. The wall thickness in the connection segment is about 2.5 to about 3.0 mm, desirably about 2.6 to about 2.9 and preferably is about 2.8 mm. The wall thickness in the connection segment 43 in one preferred embodiment does not taper from the first end towards the second end of the sleeve. This particular construction of the connection segment 43 aids in forming a consistent, reliable connection of the sleeve 40 and the tube 20 to end fitting 30.

The strain reducing segment 44 is provided with a variable wall thickness in at least one area thereof. In a preferred embodiment, the variable wall thickness in the strain reducing segment 44 tapers downwardly in wall thickness in a direction from the first end 41 of sleeve 40 to second end 42 of sleeve 40.

In a further embodiment of the present invention, the strain reducing segment 44 has a section of substantially constant wall thickness in an area adjacent to the connection segment 43 that can extend for example about 1, 5 or 25 to about 75 mm, desirably about 30 to about 70 mm and preferably about 40 to about 60 mm from the second end of the ferrule, distal to the end fitting, prior to tapering downwardly in wall thickness.

In an important aspect of the present invention, the sleeve 40 is provided with a minimum wall thickness at the second end 42 of the sleeve directly adjacent the rounded end that is at least 50%, or at least 55% of a minimum wall thickness of the sleeve in the connection segment 43 in order to provide desirable protective, strain reducing characteristics to the first end of the tube and also retain a desired stiffness to the second end of the sleeve. Maintaining the wall thicknesses described above also results in a sleeve that easily fits the hand and is easier to hold during use of the hose and any attachments.

As additionally mentioned herein, the second end 42 of sleeve 40 is rounded and therefore free of any sharp edges. The rounded end feature prevents the sleeve from abrading tube 20 in the end region of sleeve 40, such as when lateral pressure is applied to the tube in said area. In a preferred embodiment, the first end of the sleeve 41 has a flat end in order to facilitate connection of the sleeve 40 to end fitting 30. The surface on the first end is preferably square and true to the constant internal diameter of the sleeve. The sleeve surface is preferably smooth and free of lumps, bumps, or other imperfections.

The longitudinal length of sleeve 40 can vary depending upon the strain relieving characteristics desired to be imparted to tube 20. In various embodiments, the sleeve has a length that ranges about 5 to about 25 cm, desirably about 10 to about 20 cm and preferably is about 15.2 cm.

The tube utilized in the hose assembly of the present invention can be constructed as known to those of ordinary skill in the art. Tubes used for garden hoses are typically polymeric in nature and can be formed from one or more of various polymers; elastomers; and rubbers, including natural rubber, synthetic rubber and combinations thereof. The tube can have one or more reinforcing layers or portion formed from a fabric and/or various fibers as known in the art. The tube compositions of the present invention may comprise additional additives including, but not limited to, antioxidants, foaming agents, pigments, heat stabilizers, UV absorbers/stabilizers, processing aids, flow enhancing agents, nanoparticles and various fillers. The tube can be formed having any desired internal diameter, such as 0.5 inch (1.27 cm) or 0.75 inch (1.91 cm).

The sleeve according to the present invention is formed from a polymer. Any suitable polymer that provides the desirable flexibility and strain relief properties can be utilized including, but not limited to, thermoplastic elastomers, including thermoplastic vulcanizates, polyolefins, polyvinyl chloride, polyamides, polyesters, polyurethanes, with polyvinyl chloride preferred in one embodiment. Suitable thermoplastic elastomers include, but are not limited to styrenic block copolymers for example SEBS, SEEPS, SBS and SIS. In order to provide desirable strain reducing benefits, the sleeve has a hardness that ranges generally about 60 to about 90 Shore A, desirably about 65 to about 85 Shore A and preferably from about 70 to 80 Shore A measured according to ASTM-D-2240.

The sleeve can be produced utilizing various methods including, but not limited to, molding, extruding, and dip molding. In one embodiment, the dip molding process involves the use of a form, such as a cylindrical rod that is dipped in a polymeric solution. Wall thickness of each section of the tube is controlled by varying the amount of time the form is exposed to the polymeric solution which is deposited onto the form over a period of time. The number of dip cycles can also be varied to change wall thickness. For example, more dip/cure cycles will produce a thicker sleeve.

The hose assembly of the present invention can be formed in one embodiment as follows. A tube having a desired length is formed or obtained. A sleeve according to the invention is slid or otherwise located over the end of the tube such that the first end 41 of sleeve 40 and first end 26 of tube 20 are substantially aligned, for example so that the first end of the sleeve is flush with the first end of the tube. A ferrule is applied over an outside diameter of the sleeve. The stem of the male coupler is inserted into the inner diameter of the tube having the sleeve and ferrule disposed thereon. After checking desired alignment between the tube, sleeve and ferrule against the seat of the male fitting adjacent the stem, a fitting expansion machine is utilized to expand the stem of the male coupler into the hose and against the ferrule, with the sleeve connection segment located therebetween. The fitting expansion step holds the sleeve and hose securely in place between the ferrule and the stem. The present sleeve includes a line around the circumference of the sleeve to ensure the sleeve is located correctly between the ferrule and the hose.

Examples

A quantitative self-developed test was performed that used an air cylinder to force an impactor against the side of the hose. A hose was forced between a set of rollers to simulate a sharp bend with each cycle of the air cylinder. Identical hoses with and without the sleeve of the present invention were tested. A mechanical timer was connected to the air cylinder control circuit to count the number of times the impactor struck and deformed the test sample. The hose without the protective sleeve installed lasted for 2000 cycles before a hole was worn through an outer jacket of the tube of the hose assembly. The same hose model with the protective sleeve installed lasted for 8000 cycles before a hole was worn through the protective sleeve. The hose underneath the protective sleeve was still fully intact and expected to last for additional cycles. Accordingly, the test method utilized illustrates the benefits of the hose assembly of the present invention including the protective sleeve. This test method shows that even after 8000 cycles, the hose is still undamaged and expected to continue to function normally for an extended period of time.

While in accordance with the patent statutes the best mode and preferred embodiment have been set forth, the scope of the invention is not limited thereto, but rather by the scope of the attached claims.

What is claimed is:

1. A hose assembly, comprising:
  a tube comprising a polymeric material, the tube having a first end and a second end,
  an end fitting comprising a coupler comprising a threaded section mateably engageable with a coupler of another device,
  a flexible polymeric sleeve having a first end and a second end,
  wherein the sleeve extends over a portion of the tube with the first end of the sleeve located adjacent the first end of the tube, wherein the first end of the sleeve and the first end of the hose are fixedly secured to the end fitting, wherein the sleeve has a first wall thickness in a connection segment extending a distance from the first end of the sleeve and a lesser, variable wall thickness along a length of the sleeve inwardly from the connection segment in a strain reducing segment that tapers down in wall thickness in a direction towards the second end, wherein the sleeve has a minimum wall thickness at the second end of the sleeve in the strain reducing segment that extends from adjacent a ferrule of the end fitting to the second end of the sleeve that is greater than 50% of a minimum wall thickness of the sleeve in the connection segment, wherein the ferrule is a component separate and distinct from the coupler.

2. The hose assembly according to claim 1, wherein the sleeve has substantially constant wall thickness in the connection segment adjacent the strain reducing segment, wherein the strain reducing segment includes the sleeve second end.

3. The hose assembly according to claim 1, wherein the sleeve has a minimum wall thickness in the strain reducing segment that is greater than 55% of the minimum wall thickness of the sleeve in the connection segment.

4. The hose assembly according to claim 1, wherein an end surface of the sleeve first end is perpendicular to a longitudinal direction of the sleeve and the sleeve second end is rounded.

5. The hose assembly according to claim 1, wherein the sleeve has longitudinal length that ranges about 5 cm to about 25 cm.

6. The hose assembly according to claim 5, wherein the end fitting comprises a male coupler, and wherein the male coupler comprises an outer body and an inner stem press fit to the outer body.

7. The hose assembly according to claim 6, wherein the sleeve has a hardness that ranges about 60 to about 90 Shore A.

8. The hose assembly according to claim 7, wherein the sleeve has a strain reducing segment that has a section of substantially constant wall thickness that extends for 1 to 75 mm from a second end of the ferrule, distal to the end fitting, prior to tapering downwardly in wall thickness.

9. A hose assembly, comprising:
a tube comprising polymeric material, the tube having a first end and a second end,
an end fitting comprising a coupler comprising a threaded section mateably engageable with a coupler of another device, a stem, and a ferrule, wherein the ferrule is a component separate and distinct from the coupler, a flexible polymeric sleeve having a first end and a second end,
wherein the first end of the tube is disposed over the stem, wherein the sleeve extends over the tube with the first end of the sleeve located adjacent the first end of the tube, wherein the first end of sleeve and the first end of the hose are fixedly secured between the ferrule and the stem, wherein the sleeve has a substantially constant wall thickness in a connection segment longitudinally coextensive with the ferrule, wherein the sleeve has a wall thickness in a strain reducing segment adjacent the ferrule that tapers down in wall thickness in a direction towards the second end of the sleeve.

10. The hose assembly according to claim 9, wherein a minimum wall thickness of the strain reducing segment is at least 50% of the minimum wall thickness of the connection segment.

11. The hose assembly according to claim 10, wherein a minimum wall thickness of the strain reducing segment is at least 55% of the minimum wall thickness of the connection segment.

12. The hose assembly according to claim 11, wherein an end surface of the sleeve first end is perpendicular to a longitudinal direction of the sleeve and the second end is rounded.

13. The hose assembly according to claim 12, wherein the sleeve has a longitudinal length that ranges about 50 to about 250 mm.

14. The hose assembly according to claim 13, wherein the end fitting comprises a male coupler.

15. The hose assembly according to claim 14, wherein the sleeve has a hardness that ranges about 60 to about 90 Shore A.

16. The hose assembly according to claim 15, wherein the strain reducing segment has a section of substantially constant wall thickness that extends for 1 to about 75 mm from a second end of the ferrule, distal to the end fitting, prior to tapering downwardly in wall thickness.

* * * * *